United States Patent
Mortensen et al.

(10) Patent No.: US 10,558,487 B2
(45) Date of Patent: Feb. 11, 2020

(54) DYNAMIC CUSTOMIZATION OF CLIENT BEHAVIOR

(71) Applicant: Microsoft Technology Licensing, LLC, Redmond, WA (US)

(72) Inventors: Joern Lindhard Mortensen, Kirkland, WA (US); Robert Aron Drollinger, Kirkland, WA (US); Alexander Argutin, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 786 days.

(21) Appl. No.: 14/967,212

(22) Filed: Dec. 11, 2015

(65) Prior Publication Data
US 2017/0168657 A1 Jun. 15, 2017

(51) Int. Cl.
*G06F 3/00* (2006.01)
*G06F 9/46* (2006.01)
*G06F 3/01* (2006.01)

(52) U.S. Cl.
CPC ..................................... *G06F 9/46* (2013.01)

(58) Field of Classification Search
CPC ..... G06F 8/71; G06F 8/60; G06F 8/65; G06F 9/44505
See application file for complete search history.

(56) References Cited

U.S. PATENT DOCUMENTS

| | | | |
|---|---|---|---|
| 6,810,410 B1 | 10/2004 | Durham | |
| 6,832,241 B2 | 12/2004 | Tracton et al. | |
| 7,346,857 B2 | 3/2008 | Sobeski et al. | |
| 8,271,940 B2 | 9/2012 | Vitanov et al. | |
| 8,655,910 B1 | 2/2014 | Naresh et al. | |
| 8,799,355 B2 | 8/2014 | Delaney et al. | |
| 8,930,441 B2 | 1/2015 | Demant et al. | |

(Continued)

FOREIGN PATENT DOCUMENTS

WO 2000058855 A1 10/2000

OTHER PUBLICATIONS

Rao, Nithin, "Using Back-End Design to Create Customizable Front-End Mobile Experiences," Published on: May 28, 2014 Available at: https://uxmag.com/articles/using-back-end-design-to-create-customizable-front-end-mobile-experiences.

(Continued)

*Primary Examiner* — Nicholas Augustine
(74) *Attorney, Agent, or Firm* — Mannava & Kang, P.C.

(57) ABSTRACT

A dynamic customization system provides custom behavior for an application that has client code with an extensibility point and that has server code. An entity that uses the application provides a specification of custom behavior for the extensibility point to an extensibility server. The specification specifies an operation to perform after an occurrence of an extensibility event of the extensibility point during execution of the client code. A client executing the client code retrieves an indication of an extensibility server. The client then retrieves from the extensibility server a specification of the custom behavior for the extensibility point. After the occurrence of the extensibility event, the client sends to an operation server a request to perform the operation. The client may then receive from the operation server a response indicating the status of the request.

19 Claims, 11 Drawing Sheets

(56) References Cited

U.S. PATENT DOCUMENTS

| | | |
|---|---|---|
| 2004/0111728 A1 | 6/2004 | Schwalm |
| 2006/0195583 A1 | 8/2006 | Bellifemine et al. |
| 2012/0166984 A1 | 6/2012 | Brunswig et al. |
| 2014/0075350 A1 | 3/2014 | Gauthier et al. |
| 2014/0096014 A1 | 4/2014 | Johnson et al. |
| 2014/0245199 A1* | 8/2014 | Belotti ................ G06F 3/0484 715/762 |
| 2014/0282630 A1* | 9/2014 | Charles ............... G06F 9/44521 719/331 |
| 2015/0040104 A1* | 2/2015 | Mall .................... H04L 41/082 717/121 |
| 2015/0077326 A1* | 3/2015 | Kramer ................ G06F 3/0325 345/156 |
| 2015/0295985 A1* | 10/2015 | Selvaraj ............... G06F 16/958 709/217 |

OTHER PUBLICATIONS

"Extending WCF," Retrieved on: Oct. 23, 2015 Available at: https://msdn.microsoft.com/en-us/library/ms733848(v=vs.110).aspx.

"Extending Clients," Retrieved on: Oct. 23, 2015 Available at: https://msdn.microsoft.com/en-us/library/vstudio/ms730107(v=vs.100).aspx.

\* cited by examiner

DYNAMIC CUSTOMIZATION OF CLIENT BEHAVIOR

BACKGROUND

Many application programs ("applications") employ a client-server model in which clients interact with application servers executing server code of the application that provides services to clients. A client (e.g., a desktop computer, a tablet computer, or a smart phone) typically requests a service by sending a request via a communications network (e.g., the Internet) to the application server. The application server executes server code of the application that performs the requested service and provides a response to the client. A client may access the application server using either client code of the application or a program such as a web browser. With client code, the user interface is rendered by the client code as specified during development of the client code. In contrast, with a web browser the specification of the user interface is downloaded from the application server and rendered by the web browser.

There are both advantages and disadvantages of using either client code or a web browser. The client code can provide a user interface that is more sophisticated than what a web browser can provide in certain circumstances depending on the platforms and technologies that are utilized. The client code can implement more functionality due to having lower-level access to native functions on the client; depending on the platforms and technologies that are utilized. The client code can also use less communication bandwidth than a web browser because the specification of the user interface is downloaded once at installation of the client code. In contrast, the web browser generally needs to download the definition of a web page each time the web page is accessed. Client code, however, has a disadvantage in that any changes to the client code (including the user interface) need to be downloaded and installed on each client.

Application providers typically allow each entity (e.g., an organization, company, or customer) that uses their applications to customize to some degree their installation of the application. For example, if the application is a customer relationship management ("CRM") system, then one entity may want the server to log all accesses to certain sensitive CRM data, while another entity may want the server to send a text message to a technical support team when certain error messages are encountered. If an application uses client code, an entity needs to create a customized version of the client code and then download and install the customized version on each client. The entity may also create a customized version of the server code. If an application provider provides a new version of the application, the entity may need to create new customized versions of the client code and server code if the current customized versions are not compatible with the new version or forego the enhancements provided by the new version. If the application uses a web browser, the entity needs to create customized versions of web pages or generate new web pages that are stored at the server. An entity may need to hire programmers to modify or create source code of the client code or to modify or create the web pages.

Some application providers may use a plug-in model to allow entities to customize client code or web pages of an application. With a plug-in model, an entity provides plug-in code that is either installed on the client when client code is used or downloaded from a server when a web browser is used. In either case, the entity may need to hire programmers to develop the plug-in code. The plug-in model, however, is typically not supported by applications whose client code is made available via an application store (or an application marketplace). An application store is a digital distribution platform that allows application providers to make the client code of their applications available for download to clients. For example, a CRM system provider may register the client code of the CRM system with the application store and allow users associated with entities (e.g., employees of the entities) who are its customers to download client code from the application store to the clients of the users. To download client code of an application to a client, a user associated with an entity accesses the application store with the client and downloads the client code to the client. To help ensure the integrity of the application store, an application store provider provides some level of quality control over the client code to ensure, for example, that the client code is not infected by malware, that it uses only approved services, and so on. To ensure the quality of the client code after being downloaded, application stores typically do not allow the client code to support plug-ins. If the client code did support plug-ins, the plug-in could be used to circumvent the quality control of the application store.

SUMMARY

A method and system for providing custom behavior for an application having client code with an extensibility point is provided. In some embodiments, a client executing the client code retrieves an indication of an extensibility server that provides specifications of custom behavior for extensibility points. The client then retrieves from the extensibility server a specification of the custom behavior for the extensibility point. The specification specifies an operation to perform after an occurrence of an extensibility event of the extensibility point during execution of the client code. After the occurrence of the extensibility event, the client sends to an operation server a request to perform the operation. The client then may receive from the operation server a response indicating the status of the request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A dynamic customization system that allows client behavior to be dynamically customized based on the server that the client interacts with or connects to is provided. In some embodiments, an application has client code with an extensibility point at which an entity that uses the application can specify to perform a custom behavior to allow users associated with the entity that use the client code to have access to the custom behavior. For example, the application provider can define an extensibility point for adding a custom behavior to a certain display page of the application or define an extensibility point to perform a custom behavior when the client code encounters a certain error condition. An application can have any number of extensibility points. An entity that uses the application creates a specification of the custom behavior for the extensibility point and stores the specification on an extensibility server, which may be the same server that executes server code of the application. For example, the specification may specify that the custom behavior is to display a certain icon on a display page of the application and to invoke a certain web service when the user selects that icon. During execution of the client code by a client, the client code receives an indication of an extensibility server. For example, the extensibility server may be the server (e.g., the server that hosts the CRM system of an entity) that a user logs on to using the client code. The client code retrieves from the extensibility server a specification of the custom behavior for the extensibility point. The specification specifies an operation to perform after an occurrence of an extensibility event of the extensibility point during execution of the client code. For example, the extensibility event may be the user selecting an icon associated with the custom behavior or the detecting of a certain error condition. After the occurrence of the extensibility event, the client code sends to an operation server a request to perform the operation and then may receive from the operation server a response indicating the status of the request. The application server that hosts the server code of the application, the extensibility server, and the operation server may be the same server or various combinations of different servers.

In some embodiments, an extensibility server of the dynamic customization system provides a specification of custom behavior for an extensibility point of an application having client code and server code. An entity creates the specification of the custom behavior to allow the users associated with the entity to have access to the custom behavior when using client code of the application. The specification may specify the operation to be invoked upon occurrence of the extensibility event, parameters to pass when the operation is invoked, the operation server that is to perform the operation, user interface elements for customizing a display page, communication protocols to be used, authentication parameters for authenticating to the operation server, and so on. The entity may create a specification for none, some, or all of the extensibility points of an application. If a specification is not created for an extensibility point, then the client code will not perform any custom behavior for that extensibility point. The extensibility server receives from a client executing the client code a request for the specification of custom behavior for the extensibility point. The client may request the specification for all extensibility points at startup, may request the specification for an extensibility point only as needed, or may request the specification at some other time. For example, a client may request a specification for an extensibility point associated with a display page as needed when the display page is to be displayed. The extensibility server retrieves the specification of the custom behavior for the extensibility point (if one has been created). The extensibility server then sends to the client the specification of the custom behavior for the extensibility point.

The dynamic customization system helps solve several technical problems. For example, the dynamic customization system helps solve the problem of the inability of applications that are distributed through an application store to provide customization via plug-ins by providing custom behavior for such applications without using plug-ins. The dynamic customization system helps solve the problem of excessive use of computational resources (e.g., communication bandwidth, server storage, and server central processing unit usage) when clients using web browsers interact with servers to continually retrieve web pages (including web pages that have been customized) by providing custom behavior to client code that is installed on clients. As another example, the dynamic customization system helps solve the problem of how to distribute to clients of an entity the customized client code that needs to be downloaded and installed on each client whenever the customized client code changes by allowing the specifications of custom behavior to be downloaded dynamically whenever the client code is executed. The dynamic customization system helps solve the problem of adapting customizations of client code and server code to new releases of the application by the application provider by defining specifications in a way that is compatible with future releases of the application even if a future release includes client code for very different platforms and devices.

In some embodiments, the dynamic customization system allows different entities that use the application to provide different specifications of custom behavior so that users associated with different entities use the same client code but have different custom behavior. For example, Company A and Company B may both have installations of the same CRM system on their servers. Company A may specify a custom behavior to send a text message to a member of a technical support team when a certain error condition is detected, and Company B may specify a custom behavior that logs an error message when the error condition is detected. A user who logs into Company A's server using the client code would experience Company A's custom behavior, and a user who logs into Company B's server using the same client code would experience Company B's custom behavior. A single entity may even have different extensibility servers for providing different custom behaviors to different users associated with the entity. In addition, even if a single entity had only one extensibility server, the entity could create different custom behaviors for an extensibility point, for example, to be provided to different classes of users (e.g., executives, technical support, or different customers of the entity), in different geographic regions of the entity, at different times of day, and so on.

In some embodiments, the dynamic customization system uses an attribute-value pair model for the specification of custom behavior. The attributes defined by the dynamic customization system may include glyph, operation, operation server, label, tooltip, parameters, progress message, success message, suppress message, error message, and so on. The glyph attribute specifies an icon for an extensibility point that performs the custom behavior when the icon is selected. The operation attribute specifies the name of the operation to be invoked (e.g., send text message or write to log file). The operation server attribute specifies the address (e.g., Internet Protocol address) of the operation server to which the request to invoke the operation is to be sent. If no operation server is specified, then the request is sent to a default operation server of the entity. The operation server may be a server provided by an organization other than the entity. For example, if the custom behavior is to send a text message, the operation server may be provided by a text message server of a telephone company. The label attribute specifies a text label for the icon. The tooltip attribute specifies text to be displayed when a cursor hovers over the icon. The parameters attribute specifies a list of data elements of the application that are to be passed as parameters when the operation is invoked. For example, a CRM system may store a record for each customer that includes customer name, customer address, contact name, customer sales, sales representative, and so on. A customer name for the parameters attribute would indicate to send the name of the currently opened customer as a parameter for the operation. The progress message attribute specifies text of a message to be displayed while the operation is in progress. The success message attribute specifies text of a message to be displayed when the operation returns an indication that the operation was successful. The error message attribute specifies text of a message to be displayed when the operation returns an indication that the operation was unsuccessful. The suppress message attribute specifies a flag indicating whether a default success message should be suppressed. In some embodiments, the dynamic customization system may support the redirecting of a request for a specification to a different extensibility server. The dynamic customization system may define a redirect attribute that specifies a redirect extensibility server. When the client code processes a specification for an extensibility point with a redirect attribute, the dynamic customization system sends to the redirect extensibility server a request for the specification of custom behavior for that extensibility point.

The dynamic customization system may allow a custom behavior to employ a more sophisticated user interface than just the display of an icon or no user interface. For example, if the custom behavior is to log a user's access of a certain feature, the custom behavior may provide no indication to the user. As an example of a more sophisticated user interface, the custom behavior may be to send a text message to the phone number of a person identified on the display page currently being displayed to the user. In such a case, the specification of the custom behavior may include a glyph attribute specifying an input icon that suggests selecting to input a text message, an operation attribute specifying a send text message operation, and an operation server attribute specifying the text message server. In addition, the specification may include a text box attribute specifying the size of a text box, a send icon attribute specifying a send icon that suggests selecting to send the text message, and a parameters attribute specifying the text entered in the text box and the telephone number to send as parameters. When the user selects the input icon, the client code displays the text box and the send icon. The user then enters the text message in the text box. When the user selects the send icon, the client code sends a request with the send text message operation to the operation server. The request includes the text message and telephone number of the person as parameters for the invocation of the send text message operation. Another entity may specify a custom behavior for the extensibility point so that the user interface displays a drop-down list of predefined messages without any icon. When a user selects a message from the drop-down list, the client code may invoke a send to an email server a request to send an email passing the message as the body of the email and the email address of the person to send an email to the person.

Figure 1:
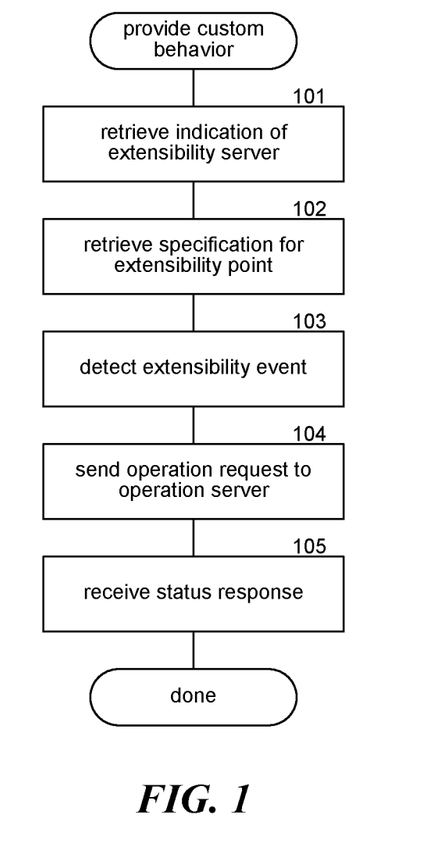
FIG. 1 is a flow diagram that illustrates the providing of custom behavior for client code in some embodiments.
Figure 1A:
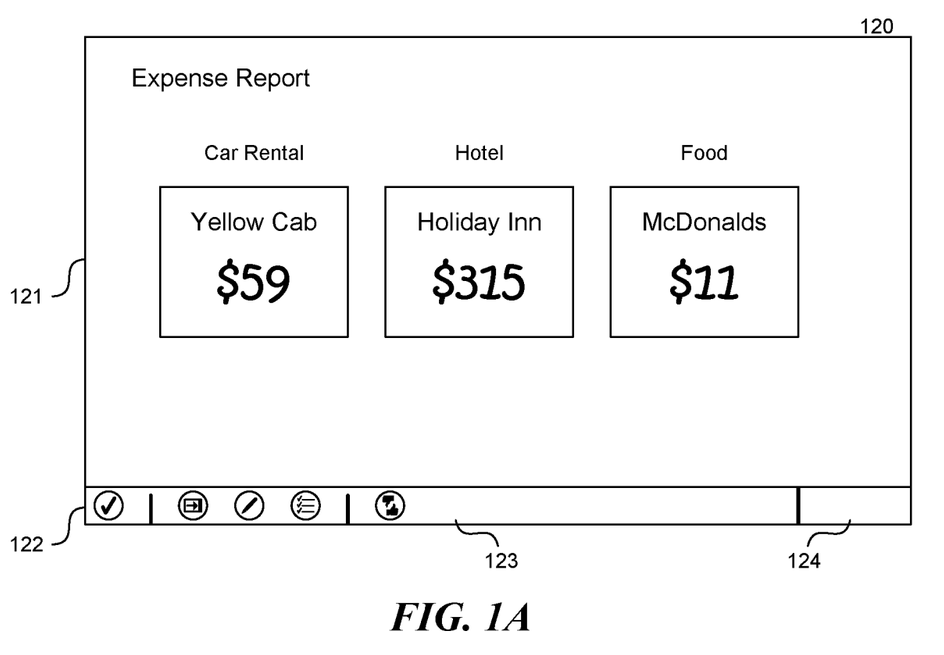
FIGS. 1A-1D illustrate variations of a display page of client code that includes a user interface region with an extensibility point.
Figure 1B:
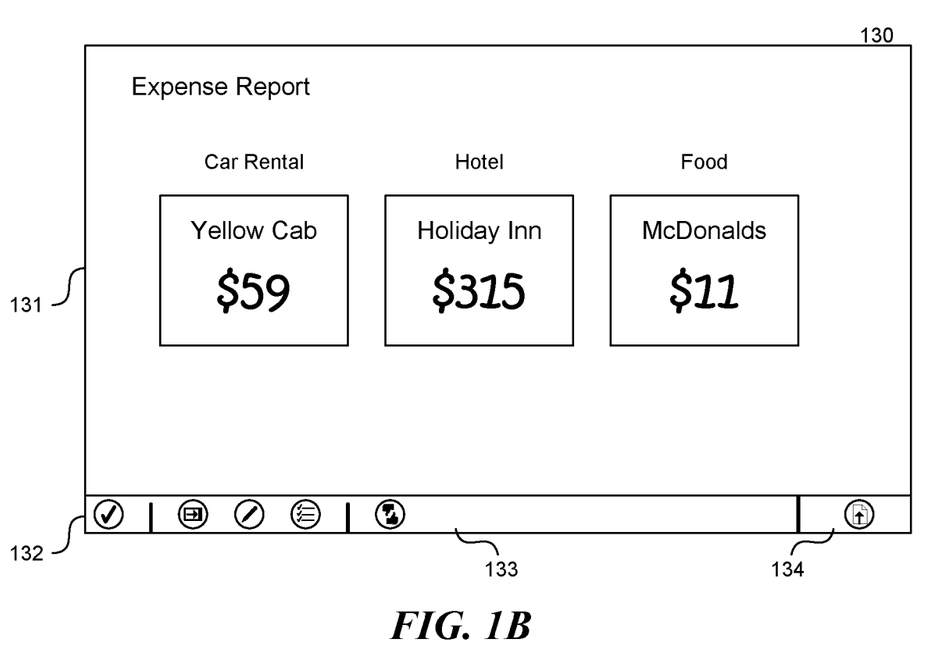
Figure 1C:
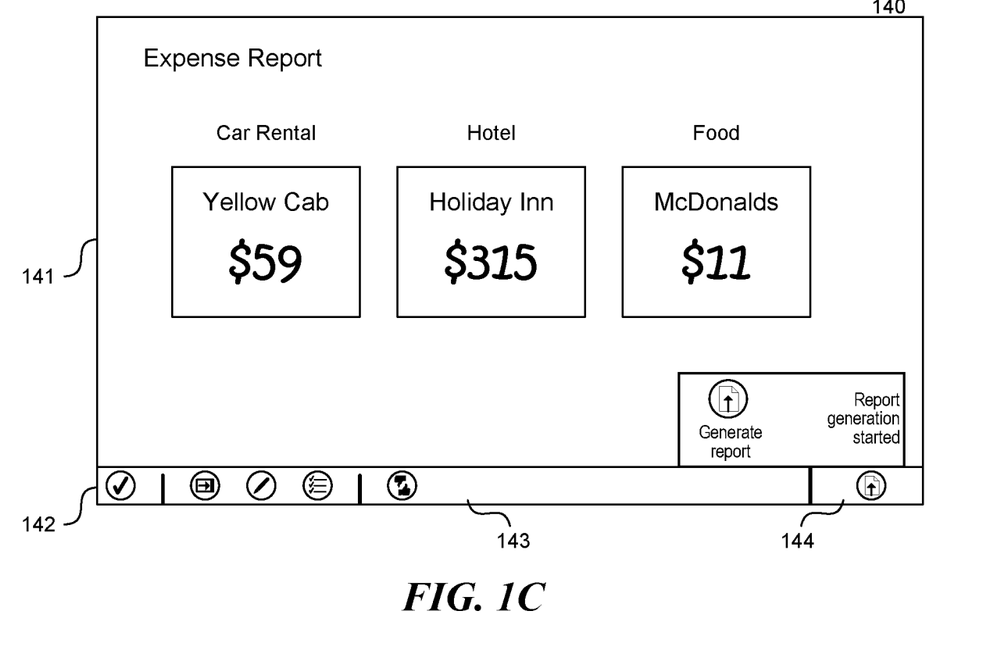
Figure 1D:
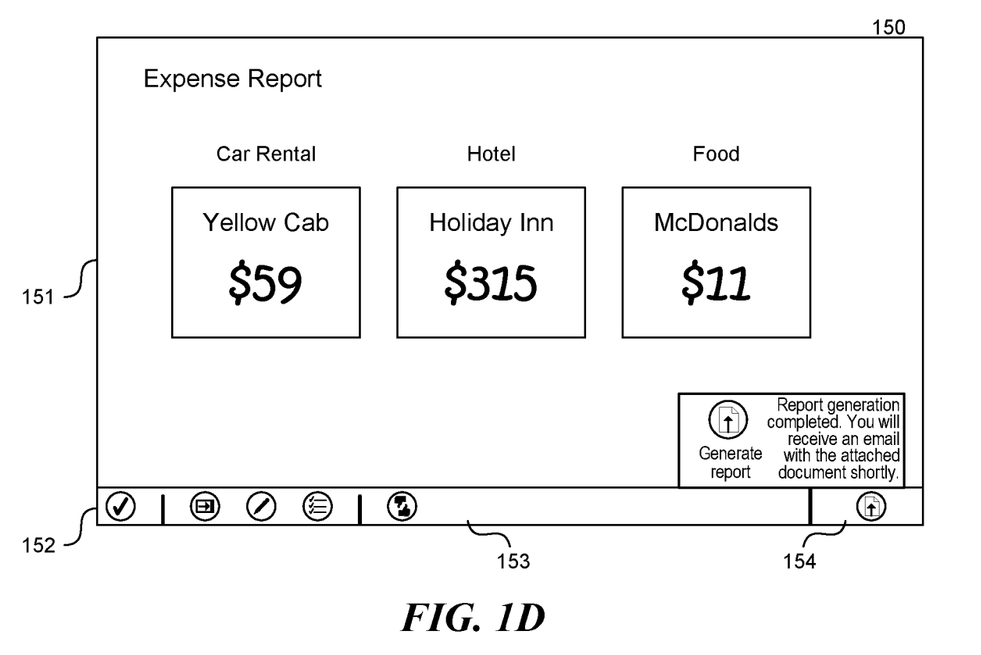

FIG. 1 is a flow diagram that illustrates the providing of custom behavior for client code in some embodiments. To provide the custom behavior for an extensibility point of an application, in block 101, the client code retrieves an indication of the extensibility server associated with the entity that provides the application. The indication may be a network address of the extensibility server. The indication may be provided in various ways. For example, the indication may be established when client code is installed on the client, when a user logs on to a server that hosts the application, and so on. In block 102, the client code retrieves the specification of the custom behavior for the extensibility point from the extensibility server. In block 103, the client code continues processing until the extensibility event is detected. If the custom behavior includes a user interface to be displayed prior to the occurrence of the extensibility event ("pre-user interface"), then the client code displays the user interface at a position on a display page as defined by the extensibility point as part of the continued processing. In some situations, such as based on performance consideration, the client code may defer retrieving the specification until the extensibility event occurs. For example, if the operation needs to be invoked as soon as the extensibility event occurs, then the specification may be retrieved in advance. Otherwise, the retrieval can be deferred until the extensibility event occurs. In block 104, the client code prepares and sends a request to invoke the operation to the operation server. In block 105, the client code receives from the operation server a status response message. If the custom behavior includes a user interface to be displayed after the occurrence of the extensibility event ("post-user interface"), the client code displays the specified user interface in block 104 and/or block 105.

FIGS. 1A-1D illustrate variations of a display page of client code that includes a user interface region with an extensibility point. In the example of these figures, the display pages display information and icons relating to an expense report application. Each display page 120, 130, 140, and 150 includes a content area 121, 131, 141, and 151 and tool bar 122, 132, 142, and 152. The content area displays information about an expense report of an employee, and the tool bar displays an icon that a user can select to take certain actions (e.g., save and delete) relating to an expense report. Each tool bar includes a standard icon area 123, 133, 143, and 153 and a custom icon area 124, 134, 144, and 154. The standard icon area displays standard icons provided by default by the application. The custom icon area corresponds to a user interface region with an extensibility point. Display page 120 shows that the custom icon area 124 is empty when no custom behavior is specified for the extensibility point. Display page 130 shows that the custom icon area 134 contains an icon when custom behavior is specified for the extensibility point. In this example, the custom behavior is to generate a certain report and email the report to, for example, a supervisor of the employee for approval. So, when a user selects the icon in the custom icon area, the report is generated and sent. Display page 140 shows a post-user interface 145 when the icon is selected as confirmation of the selection and the behavior. Display page 150 shows another post-user interface 155 that is displayed when the report has been sent as confirmation to the user. Although not shown, the custom behavior may specify tool tip information that is displayed when the custom icon is hovered over such as "send expense reports to supervisor for approval."

Figure 2:
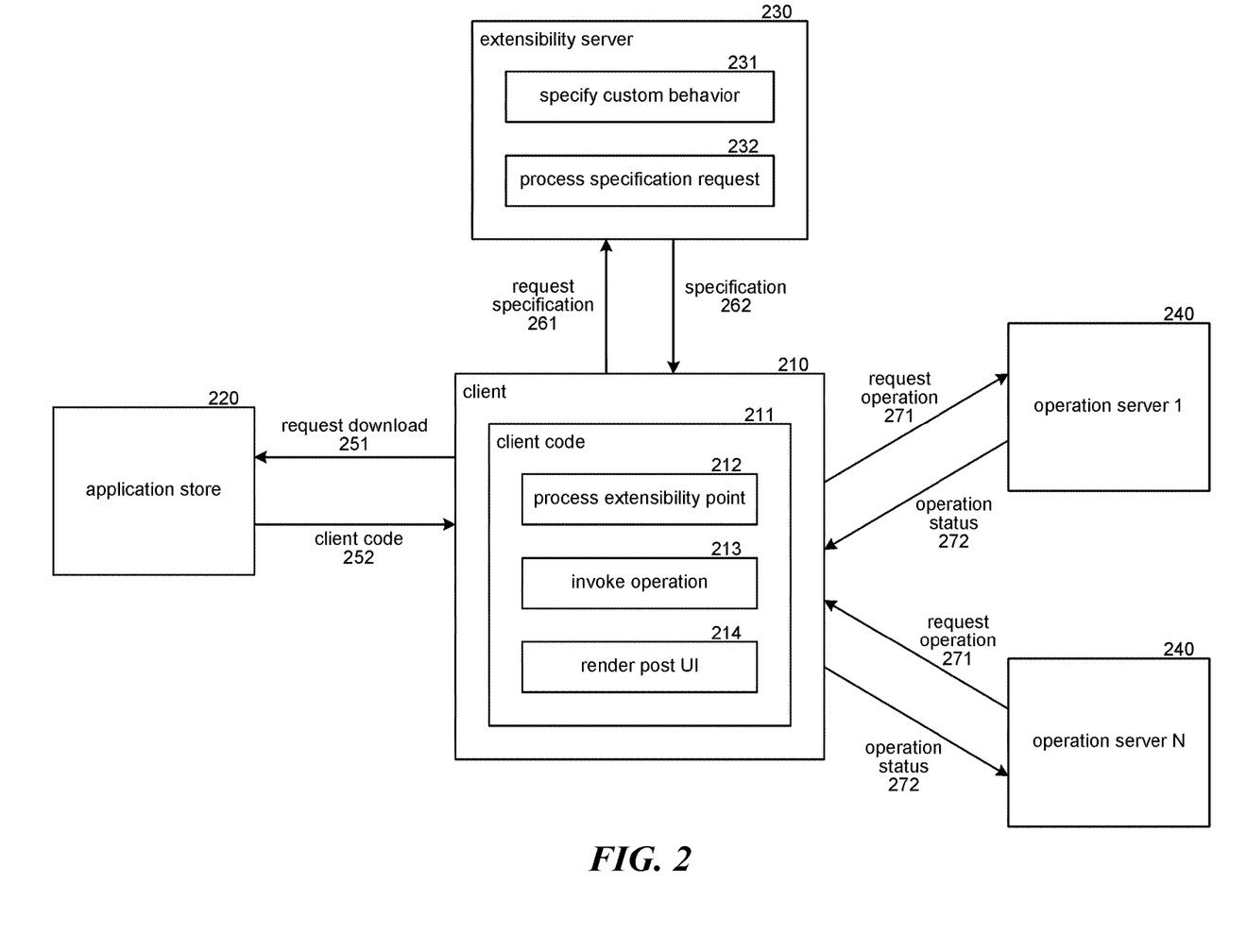
FIG. 2 is a block diagram that illustrates computer systems providing dynamic customization in some embodiments.

FIG. 2 is a block diagram that illustrates computer systems providing dynamic customization in some embodiments. The computer systems include a client 210 that communicates with an application store 220, an extensibility server 230, and operation servers 240. The computer systems may communicate using various communication channels such as the Internet, a local area network, a satellite network, and so on. The computer systems may communicate using various protocols such as TCP/IP, 802.1, SOAP, JSON, HTTP, and so on. Initially, a user of the client downloads the client code 211 from the application store and installs it on the client. The application store is a digital distribution platform that allows application providers to make the client code of their applications available for download to clients. The application store may be a platform-specific market place, a location of a file server, a location on a web site, and so on. To download the client code, the client sends 251 a download request to the application store and receives 252 the client code in return. The client code includes a process extensibility point component 212, an invoke operation component 213, and a render post-user interface component 214. When the client code is executed, the process extensibility point component of the client code sends 261 to the extensibility server a request for the specification of custom behavior for an extensibility point and receives 262 from the extensibility server the specification. The extensibility server may include a specify custom behavior component 231 to allow an entity to create specifications and a process specification request component 232 to provide specifications to clients. When an extensibility event occurs for which a custom behavior has been specified, the invoke operation component of the client sends 271 to the operation server a request to invoke the operation and receives 272 from the operation server the status of the operation. The render post-user interface component of the client code may render any post-user interface if any is defined. Multiple operation servers are illustrated to indicate that the custom behavior for each extensibility point of the application may indicate a different operation server.

The computing systems on which the dynamic customization system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems of clients may include desktop computers, laptops, tablets, e-readers, personal digital assistants, smartphones, gaming devices, servers, and so on. The computing systems of servers and clients may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the dynamic customization system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The dynamic customization system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the dynamic customization system may be implemented in hardware using, for example, an application-specific integrated circuit (ASIC).

Figure 3:
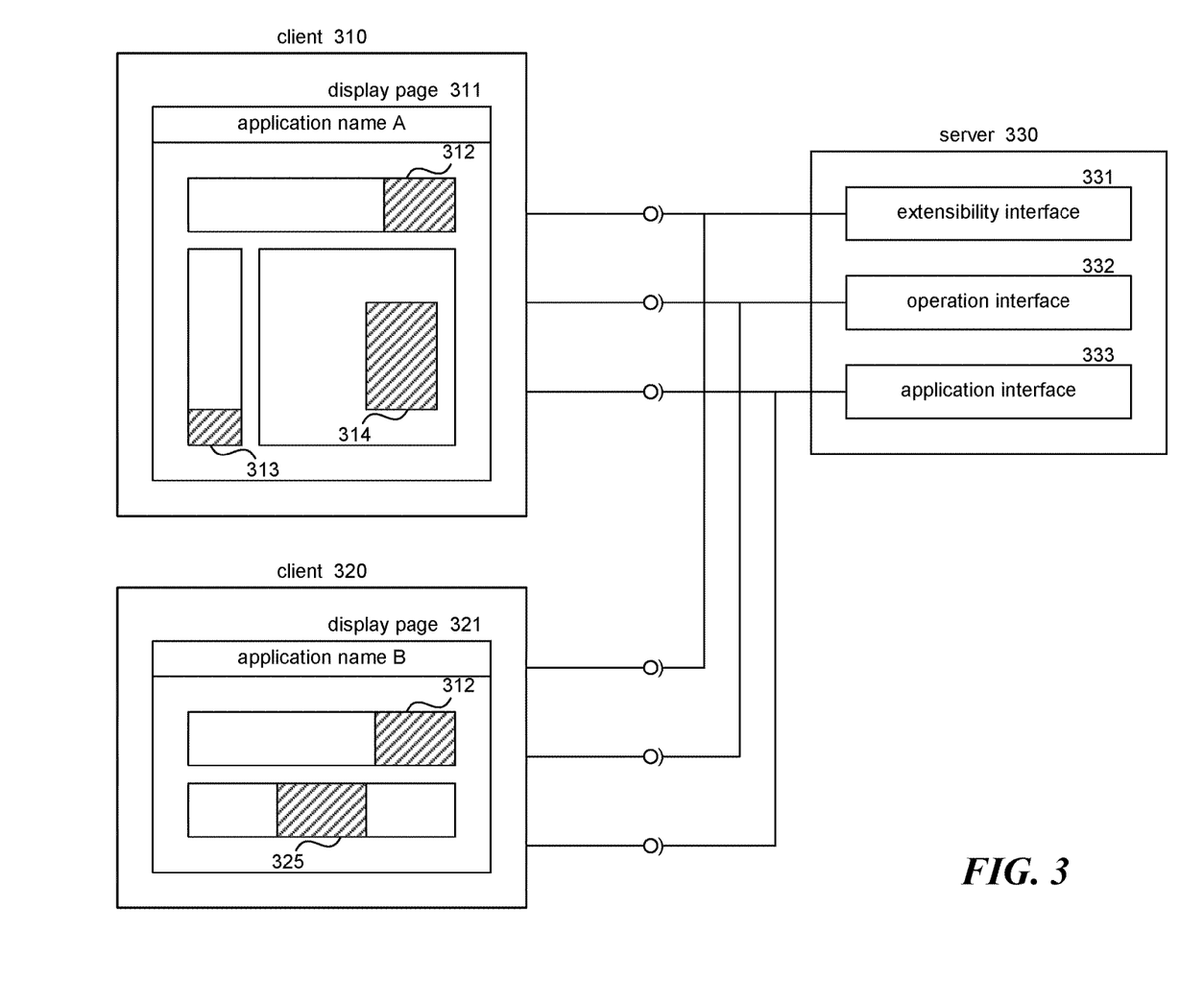
FIG. 3 is a block diagram illustrating different extensibility points within client code in some embodiments.

FIG. 3 is a block diagram illustrating different extensibility points within client code in some embodiments. A client 310 and a client 320 interface with a server 330. The client 310 executes client code of an application named "A", and client 320 executes client code of an application named "B." The server includes an extensibility interface 331, an operation interface 332, and an application interface 333. In this example, the server acts as the extensibility server, the operation server, and the application server. The extensibility interface provides access to the extensibility server, and the operation interface provides access to the operation server. The application interface provides access to default functionality provided by the application server. The default functionality is the set of functions provided to client code that executes without any custom behavior. Some of the operations specified by custom behavior may be operations provided as part of the default functionality. For example, the default functionality may provide a print report operation that is invoked with certain parameters when a user selects a print icon that is displayed on a certain display page. If the display page has an extensibility point, a specification of custom behavior may specify another icon and the print report operation with different parameters. A display page 311 of a client user interface of client 310 is illustrated. The display page 311 includes user interface regions 312, 313, and 314 for extensibility points. The custom behavior for each of these extensibility points may be specified using the extensibility server. When the client code is to display this display page, it accesses any specifications of custom behavior for the extensibility points and displays the specified user interface in the user interface regions. A display page 321 of a client user interface of client 320 is illustrated. The display page 321 includes user interface regions 312 and 325 for extensibility points. The client code for application "B" uses the same user interface region 312 as application "A", does not use user interface regions 313 and 314, and uses a different user interface region 325. Thus, different applications of an entity can use the same extensibility server and the specifications of custom behavior so that users associated with that entity can have access to the same custom behavior with different applications.

Figure 4:
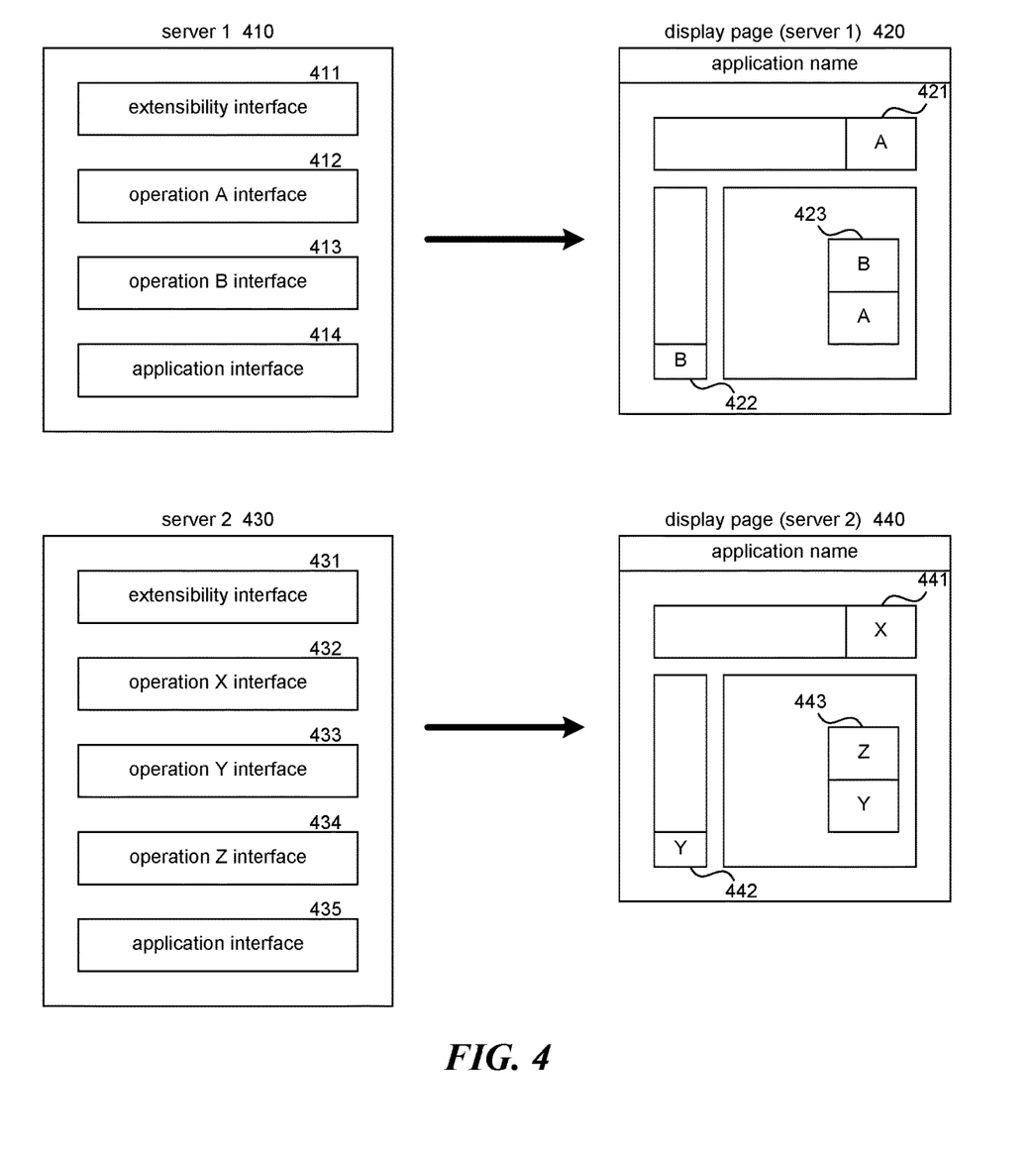
FIG. 4 is a block diagram illustrating effects of different custom behaviors for different user interface regions associated with extensibility points in some embodiments.

FIG. 4 is a block diagram illustrating effects of different custom behaviors for different user interface regions associated with extensibility points in some embodiments. A server 410 includes an extensibility interface 411, an operation A interface 412, an operation B interface 413, and an application interface 414. A display page 420 of a client user interface includes user interface regions 421, 422, and 423. Two extensibility points are defined for the user interface region 423. When a client is connected to the server 410, operation A is invoked when the user interacts with the user interface region 421 as indicated by the "A." Operation B is invoked when the user interacts with the user interface region 422 as indicated by the "B." The user interface region 423 has two extensibility points, and different operations are invoked for those extensibility points as indicated by the "A" and the "B." A server 430 includes an extensibility interface 431, an operation X interface 432, an operation Y interface 433, an operation Z interface 434, and an application interface 435. The display page of a client user interface 440, which is the same display page as that of the client user interface 420, includes user interface regions 441, 442, and 443 with extensibility points. When a client is connected to the server 430 instead of the server 410, operation X is invoked when the user interacts with the user interface region 441 as indicated by the "X." Operation Y is invoked when the user interacts with the user interface region 442 as indicated by the "Y." The user interface region 443 has two extensibility points and different operations are invoked for those extensibility points, as indicated by the "Y" and the "Z."

A single entity may provide different extensibility servers for different classes of users. For example, the extensibility server for executives of the entity may provide greater functionality than what is provided by the extensibility server for the sales staff. The executives may have different custom behaviors for some extensibility points or may even have a custom behavior for an extensibility point when the sales staff has no custom behavior for that extensibility point. As another example, different extensibility servers may be provided based on the home region of the user. For example, the custom behavior of an extensibility point may be provided in different languages for different countries or may provide different accounting functions based on the customs and laws of a particular country. When a user logs into the server of the entity, the server may provide to the user's client code the address or other identifying information of the extensibility server for the class of that user. Alternatively, when a user installs client code on a client, the client may be configured with the identifying information of the extensibility server to use. As another alternative, all users may access the same extensibility server, but be provided different custom behavior based on the class of the user. When client code retrieves a specification of custom behavior for an extensibility point, the client code may provide information identifying the user or the class of the user. The extensibility server provides the specification of custom behavior for the class of the user.

Figure 5:
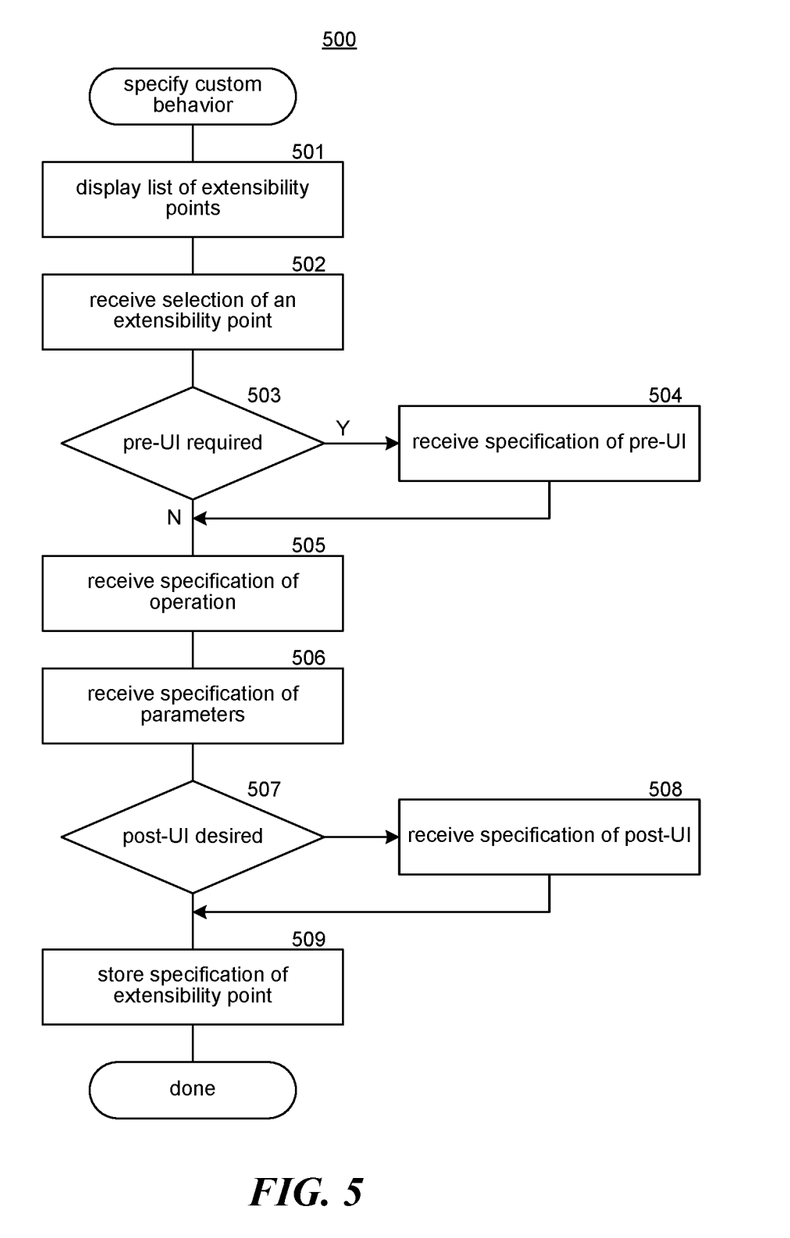
FIG. 5 is a flow diagram that illustrates processing of a specify custom behavior component of an extensibility server in some embodiments.

FIG. 5 is a flow diagram that illustrates processing of a specify custom behavior component of an extensibility server in some embodiments. A specify custom behavior component 500 allows a user to specify the custom behavior for an accessibility point. The extensibility server may store information describing each accessibility point such as whether a pre-user interface is required, the parameters that are available, a representation of the display page in which the user interface is displayed, and so on. In block 501, the component displays the list of extensibility points. In block 502, the component receives from a user a selection of an extensibility point whose custom behavior is to be specified. In decision block 503, if a pre-user interface is required for the extensibility point, then the component continues at block 504, else the component continues at block 505. In block 504, the component receives from the user the specification of the pre-user interface. For example, if the pre-user interface is only an icon, then the user may specify the glyph for that icon. If the pre-user interface includes a text box and a send icon, then the user may specify the size of the icon and a glyph for the send icon. In block 505, the component receives the specification of the operation and the operation server if other than a default operation server. In block 506, the component receives from the user a specification of the parameters to be passed when the operation is invoked, if any are defined for the operation. In decision block 507, if a post-user interface is desired, then the component continues at block 508, else the component continues at block 509. In block 508, the component receives the specification of the post-user interface from the user. The post-user interface may specify, for example, what information to display when the operation is successful and when the operation is not successful. In block 509, the component stores the specification of the extensibility point and then completes. In some embodiments, the extensibility server may not provide a specify custom behavior component. In such embodiments, a user may create a text document (e.g., using a word processor) that provides the specifications in an attribute-value pair format in accordance with definitions of extensibility points provided by the application provider.

Figure 6:
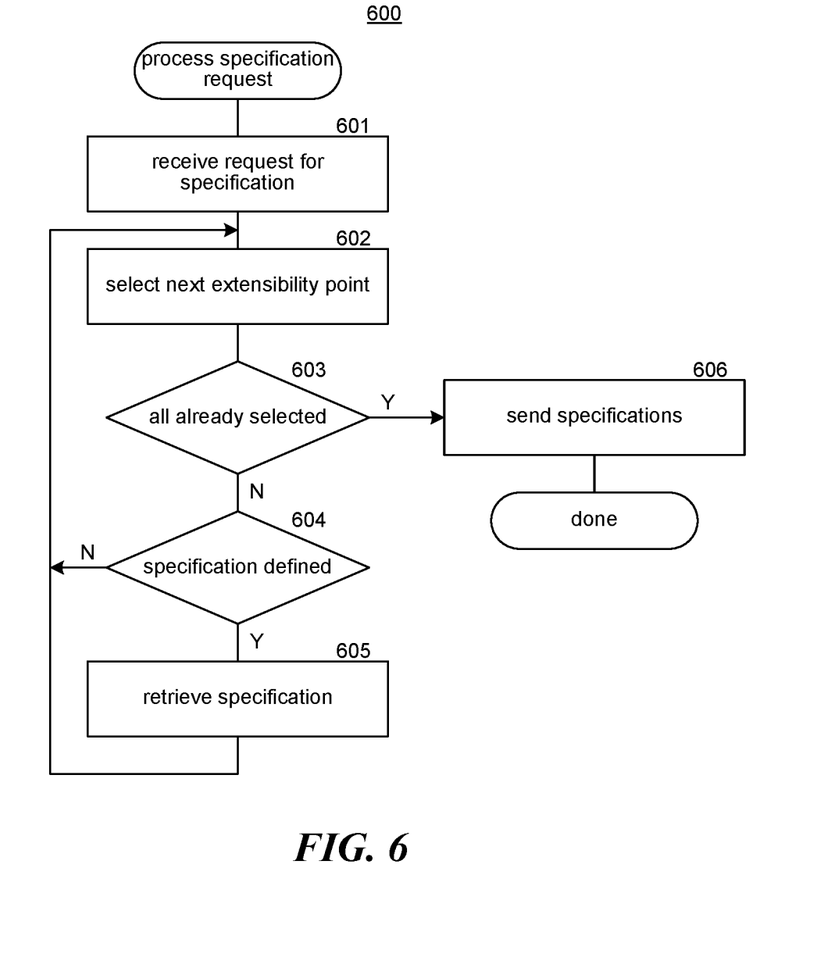
FIG. 6 is a flow diagram that illustrates processing of a process specification request component of an extensibility server in some embodiments.

FIG. 6 is a flow diagram that illustrates processing of a process specification request component of an extensibility server in some embodiments. A process specification request component 600 receives a request for specifications for extensibility points and returns the specifications. In block 601, the component receives from a client a request for specifications of custom behaviors that have been specified by the entity. In blocks 602-604, the component loops retrieving the specifications. In block 602, the component selects the next extensibility point of the application. In decision block 603, if all the extensibility points have already been selected, then the component continues at block 606, else the component continues at block 604. In decision block 604, if a specification has been defined for the selected extensibility point, then the component continues at block 605, else the component loops to block 602 to select the next extensibility point. In block 605, the component retrieves the specification of custom behavior and then loops to block 602. In block 606, the component sends the specifications to the requesting client and then completes.

Figure 7:
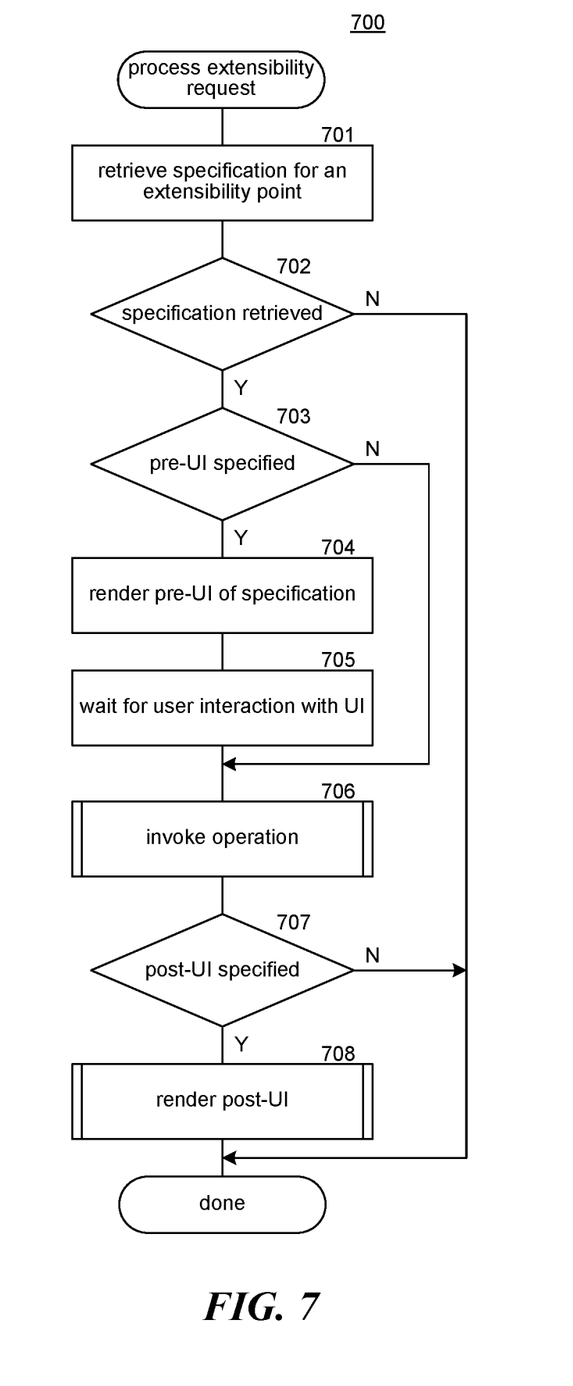
FIG. 7 is a flow diagram that illustrates processing of a process extensibility point component of client code in some embodiments.

FIG. 7 is a flow diagram that illustrates processing of a process extensibility point component of client code in some embodiments. A process extensibility point component 700 may be invoked when execution of client code reaches an extensibility point. For example, client code may reach an extensibility point when a display page associated with an extensibility point is to be displayed or when an error condition associated with an extensibility point is detected. In block 701, the component retrieves the specification for the extensibility point. In decision block 702, if the specification is retrieved, then the component continues at block 703, else no custom behavior has been specified for this extensibility point and the component completes. In decision block 703, if a pre-user interface is specified for the extensibility point, then the component continues at block 704, else the component continues at block 706. In block 704, the component renders the pre-user interface of the specification. In block 705, the component waits for user interaction with the pre-user interface, such as selecting an icon. The component may execute under a separate thread of execution so that other threads of execution of the client code continue to execute while the component waits. In block 706, the component calls an invoke operation component to invoke the operation. In decision block 707, if a post-user interface is specified, then the component continues at block 708, else the component completes. In block 708, the component calls a render post-user interface component to render the user interface after occurrence of the extensibility event and then completes.

Figure 8:
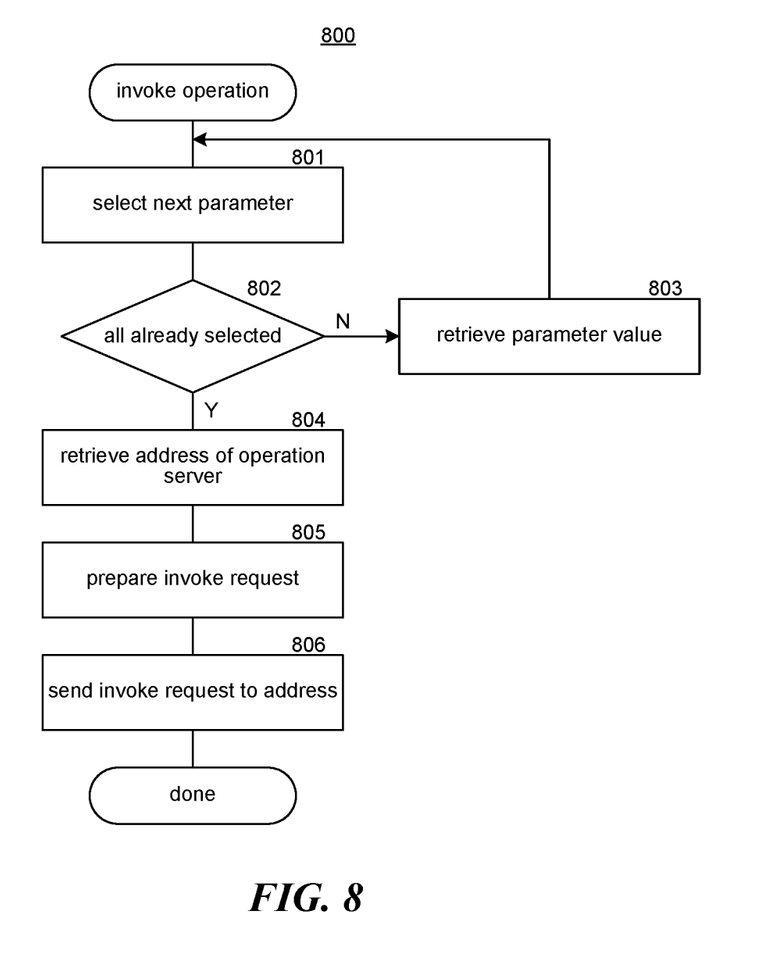
FIG. 8 is a flow diagram that illustrates processing of an invoke operation component of client code in some embodiments.

FIG. 8 is a flow diagram that illustrates processing of an invoke operation component of client code in some embodiments. An invoke operation component 800 is called to invoke the operation associated with a specification. In blocks 801-803, the component loops retrieving the parameters for the operation. In block 801, the component selects the next parameter specified by the specification. In decision block 802, if all the parameters have already been selected, then the component continues at block 804, else the component continues at block 803. In block 803, the component retrieves the value for the parameter and loops to block 801 to select the next parameter. In block 804, the component retrieves the address of the operation server, which may be specified in the specification or which may be a default address. In block 805, the component prepares an invoke request message. In block 806, the component sends the invoke request message to the address of the operation server and then completes.

Figure 9:
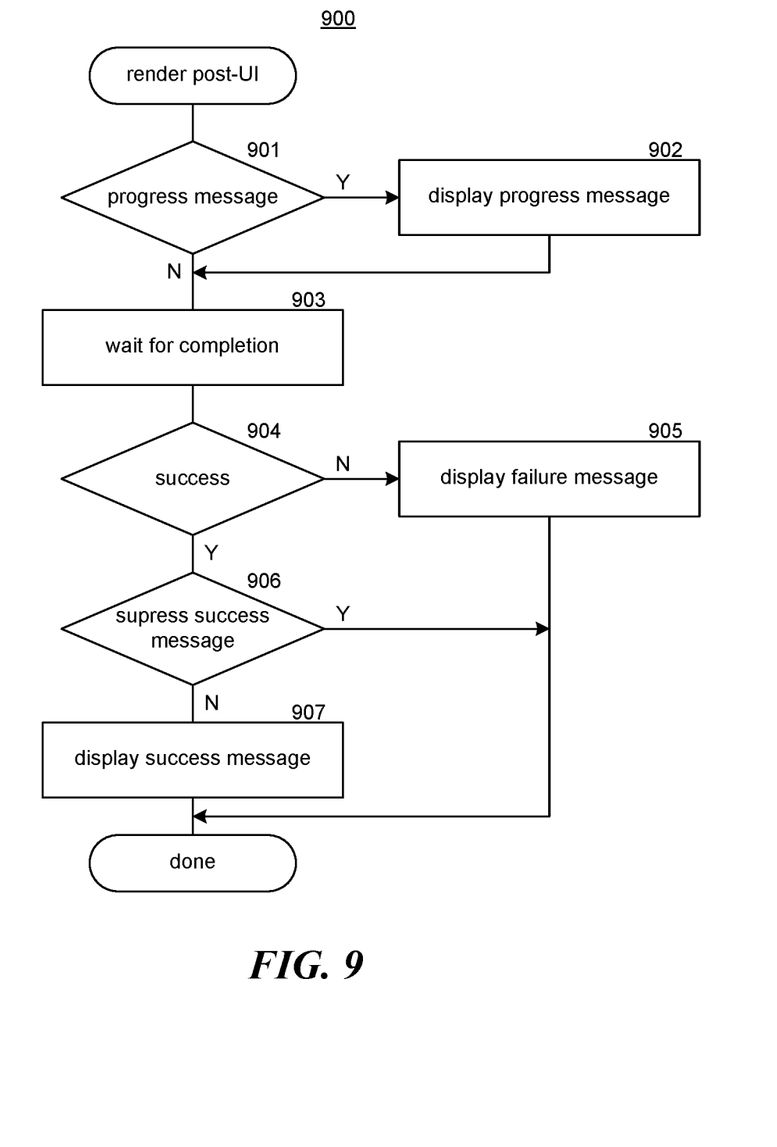
FIG. 9 is a flow diagram that illustrates processing of a render post-user interface component of client code in some embodiments.

FIG. 9 is a flow diagram that illustrates processing of a render post-user interface component of client code in some embodiments. A render post-user interface component 900 is called to render a user interface after the extensibility event has occurred. In decision block 901, if a progress message is defined by the specification of custom behavior, then the component continues at block 902, else the component continues at block 903. In block 902, the component displays the progress message of the specification and continues at block 903. In block 903, the component waits for completion of the operation. In decision block 904, if the operation completed successfully, then the component continues at block 906, else the component continues at block 905. In block 905, the component displays a failure message and then completes. In decision block 906, if a suppress success message attribute is specified, then the component completes, else the component continues at block 907. In block 907, the component displays the success message and then completes.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, in some embodiments, the client using the dynamic customization system is itself a server that is a client of the application server; such a server may be referred to as a client-server. As an example, the client code of an application may be installed on client-servers of a data center. A user may use a web browser to display the display pages of the client code that executes on the client-servers. Accordingly, the invention is not limited except as by the appended claims.

The invention claimed is:

1. A method performed by a computing device, the method comprising:
during execution of client code of an application having an extensibility point by the computing device,
receiving, by the computing device, an indication of an extensibility server from which the computing device is to retrieve a specification of custom behavior for the extensibility point;
retrieving, by the computing device, from the extensibility server, the specification of custom behavior for the extensibility point, the specification specifying:
an operation to be performed in response to the computing device detecting an occurrence of an extensibility event of the extensibility point; and
an identification of an operation server to perform the operation, wherein the operation server is a different server than the extensibility server;
detecting, by the computing device, the occurrence of the extensibility event; and
in response to detecting the occurrence of the extensibility event,
sending, by the computing device, to the operation server identified in the retrieved specification a request to perform the operation, wherein the operation server is to perform the requested operation and to determine a status of the requested operation; and
receiving, by the computing device, from the operation server a response indicating the status of the requested operation.

2. The method of claim 1 wherein the application includes server code and an entity that uses the application provides the specification of custom behavior for the application so that users associated with the entity that uses the client code have access to the custom behavior.

3. The method of claim 2 wherein different entities that use the application provide different specifications of custom behavior so that users associated with different entities use the same client code but have different custom behavior.

4. The method of claim 2 wherein different applications of the entity use the same extensibility server and specifications of custom behavior so that users associated with the entity have access to the same custom behavior with different applications.

5. The method of claim 1 further comprising, prior to execution of the client code, downloading the client code from an application server.

6. The method of claim 1 wherein the client code does not support plug-ins.

7. The method of claim 1 wherein the specification of custom behavior further specifies a parameter that the client code is to provide when sending the request to perform the operation.

8. The method of claim 1 wherein the specification of custom behavior further specifies a user interface to display for the extensibility point.

9. The method of claim 8 wherein the extensibility event occurs when a user has a certain interaction with the user interface.

10. A system comprising:
a processor of an extensibility server; and
a computer-readable storage medium storing computer-executable instructions that when executed by the processor of the extensibility server, cause the processor of the extensibility server to:

receive, from a client executing client code of an application, a request for a specification of custom behavior for an extensibility point of the client code;

access the specification of custom behavior for the extensibility point of the client, the specification of custom behavior specifying:
- an operation to be performed by an operation server in response to detecting an occurrence of an extensibility event of the extensibility point during execution of the client code; and
- an identification of the operation server to perform the operation, wherein the operation server is a different server than the extensibility server, and wherein the operation server is to determine a status of a requested operation and to send a response to the client indicating the status of the requested operation; and in response to receipt of the request for the specification of custom behavior, send to the client, the specification of custom behavior.

11. The system of claim 10, further comprising the operation server, and wherein the operation server further comprises:
computer-executable instructions to cause a processor of the operation server to receive from the client a request to perform the operation in response to the client detecting the occurrence of the extensibility event; and
computer-executable instructions to cause the processor of the operation server to, in response to receipt of the request to perform the operation, perform the operation.

12. The system of claim 11, wherein the operation is performed by server code of the application.

13. The system of claim 11, wherein the operation is performed by code that is not part of the application.

14. The system of claim 11, wherein the specification of custom behavior further specifies a parameter that the client code is to provide when sending the request to perform the operation.

15. The system of claim 10, wherein the specification of custom behavior further specifies a user interface to display for the extensibility point.

16. The system of claim 15, wherein the extensibility event occurs when a user has a predetermined interaction with the user interface.

17. One or more computer-readable mediums storing computer-executable instructions that when executed by a client, cause the client to:
during execution of client code of an application having an extensibility point,
- receive an indication of an extensibility server from which the client is to retrieve a specification of custom behavior for the extensibility point;
- retrieve, from the extensibility server, the specification of custom behavior for the extensibility point, the specification of custom behavior specifying:
  - an operation to be performed in response to the client detecting an occurrence of an extensibility event of the extensibility point during execution of the client code and
  - an identification of an operation server to perform the operation, wherein the operation server is a different server than the extensibility server;
- detect the occurrence of the extensibility event; and
- in response to detecting the occurrence of the extensibility event, send to the operation server identified in the retrieved specification a request to perform the operation, wherein the operation server is to perform the requested operation and to determine a status of the requested operation; and
- receive, from the operation server, a response corresponding to the request to perform the operation, the response indicating the status of the requested operation.

18. The one or more computer-readable mediums of claim 17 wherein the specification of custom behavior further specifies a parameter that the client code is to provide when sending the request to perform the operation.

19. The one or more computer-readable mediums of claim 17 wherein the specification of custom behavior further specifies a user interface to display for the extensibility point.

* * * * *